United States Patent [19]

Drzewiecki

[11] Patent Number: 5,269,340
[45] Date of Patent: Dec. 14, 1993

[54] COMBINED HOT TAP PIPE CUTTER AND GATE VALVE FOR PLASTIC PIPE

[75] Inventor: Gregory J. Drzewiecki, Oak Lawn, Ill.

[73] Assignee: Institute of Gas Technology, Chicago, Ill.

[21] Appl. No.: 962,491

[22] Filed: Oct. 15, 1992

[51] Int. Cl.⁵ .............................................. F16K 43/00
[52] U.S. Cl. ...................................... 137/318; 30/92; 83/622; 83/745
[58] Field of Search ................. 137/318; 408/67, 87, 408/92, 137, 204, 703; 30/92; 83/622, 745

[56] References Cited

U.S. PATENT DOCUMENTS

| | | | |
|---|---|---|---|
| 2,237,476 | 4/1941 | Cline | 137/318 |
| 3,687,166 | 8/1972 | Herrin | 137/318 |
| 3,749,108 | 7/1973 | Long | 137/15 |
| 3,833,020 | 9/1974 | Smith | 137/318 |
| 3,863,667 | 2/1975 | Ward | 137/318 |
| 3,867,964 | 2/1975 | Gardner | 137/318 |
| 3,905,718 | 9/1975 | Luckenbill et al. | 137/318 |
| 3,948,282 | 4/1976 | Yano | 137/15 |
| 4,119,115 | 10/1978 | Carruthers | 137/318 |
| 4,177,827 | 12/1979 | Smith et al. | 137/318 |
| 4,258,742 | 3/1981 | Louthan et al. | 137/318 |
| 4,355,656 | 10/1982 | Smith | 137/318 |
| 4,431,017 | 2/1984 | Willemsen | 137/15 |
| 4,515,177 | 5/1985 | Thalmann et al. | 137/318 |
| 4,552,170 | 11/1985 | Margrave | 137/318 |
| 4,628,955 | 12/1986 | Smith | 137/318 |
| 4,655,480 | 4/1987 | Thalmann | 137/318 |
| 5,076,311 | 12/1991 | Marschke | 137/318 |
| 5,152,310 | 10/1992 | O'Bryon | 137/318 |

Primary Examiner—George L. Walton
Attorney, Agent, or Firm—Speckman, Pauley & Fejer

[57] ABSTRACT

A combination pipe cutter and gate valve for plastic pipe insertable into an in service pipe through which a fluid is flowing. The combination pipe cutter and gate valve comprises a valve body, means for securing a valve body around a portion of the plastic pipe into which the valve is to be inserted, a shear disposed within the valve body, means for lowering the shear toward the pipe and a cutting element secured to the leading edge of the shear, the cutting element forming a single cutting edge having a length such that the pipe is completely severed after the shear has passed completely through the pipe. As the shear passes through the pipe, the plastic material of the plastic pipe is deformed forming a seal against the faces of the shear.

18 Claims, 2 Drawing Sheets

COMBINED HOT TAP PIPE CUTTER AND GATE VALVE FOR PLASTIC PIPE

BACKGROUND OF THE INVENTION

1. Field of the Invention

This invention relates to an apparatus for insertion of flow control devices into plastic pipe through which a fluid is flowing without removing the plastic pipe from service or otherwise interrupting flow through the plastic pipe.

2. Description of the Prior Art

Hot tapping of in-service pipelines is used to add valves, regulators, branch connections, and other devices to existing pipelines as well as to make in-service repairs on such pipelines. In hot tapping an in-service pipeline, it is necessary to cut an opening in the pipe for insertion of the valve or regulator, or for connection of a branch pipe. To prevent fluid within the pipe from escaping, a hot tap saddle is sealingly secured to the pipe around the portion of the pipe in which the hole is to be made. The saddle is provided with a gate valve or other means for providing access to the pipe without permitting fluid to escape from the pipe. A saddle suitable for such purpose is taught by U.S. Pat. No. 4,655,480.

Due to strength of material considerations, systems utilizing plastic pipe require considerations different from metal pipes when hot tapping. At least three techniques are currently known and used for hot tapping plastic pipes to insert a valve or branch connection, all of them having important limitations. The most frequently used technique involves squeezing the plastic pipe to shut down flow through the pipe after which the valve o branch connection can be installed. However, squeezing may affect the long term strength of the pipe. In addition, a potential safety hazard is created due to static electricity generation. And finally, flow through the pipe is interrupted, a less than desirable condition.

A second known technique is more direct and involves th installation of commercially available valves to be actuated through valve boxes when the need arises. However, the cost of such a valve installation is high. In addition, retrofitting of plastic pipe systems with known valves requires two squeeze off operations, thereby resulting in flow interruptions and safety hazards due to a generation of static electricity.

A third technique is a commercially available line stopper developed specifically for plastic pipe. However, such a line stopper is intended primarily for temporarily stopping flow in a plastic pipe and is not suitable for use as a sectionalizing valve. In addition, known devices of this type are also limited to pipe sizes of four inches and larger due to the complicated nature of their mechanisms. Thus, such stoppers are not suitable for plastic pipes having diameters less than four inches.

Hot tapping of a full bore valve in a plastic pipe having a fluid flowing therethrough is taught by U.S. Pat. No. 4,628,955, U.S. Pat. No. 3,687,166, U.S. Pat. No. 4,177,827, and U.S. Pat. No. 4,119,115. The '955 patent teaches a valve having a two part valve body which surrounds the pipe, the valve body parts being secured together by mechanical fasteners. The valve is equipped with a gate on a valve stem which can be reciprocated to open and close the valve. The gate has two gate sections, each having on its lower or leading edge a sharp knife edge which shears the pipe wall when the gate is initially advanced to the closed position by turning the valve stem and ultimately severs the pipe. As the gate approaches the fully closed position, the leading edges of the gate sections encounter a camming surface which acts to mechanically depress the gate sections against their seats to assure a tight closure of the valve. The '166 patent discloses a control valve having a split housing disposed around a portion of pipe and sealed against the pipe by O-rings, solder, sealing compound, plastic film, or other suitable sealing material. Coupled to the lower end of the valve stem is a body, the lower end of which is provided with a pair of cutters such that when the valve stem is turned, the body is lowered toward the pipe and the cutting edge cuts through the pipe wall to completely sever the pipe. The remainder of the body is a solid wedge gate valve which can be used to control the flow of fluid through the pipe. The '827 patent teaches a flow control apparatus having a fluid tight housing mounted around a pipe, a shear, an actuator means for cutting transversely through the pipe wall and a second independent actuator means for moving a surface associated with the shear into engagement with the sealing surface around the pipe. Finally, the '115 patent teaches an apparatus for cutting into and stopping the flow of fluid in a plastic pipe having a cutting blade that is forced downwardly into a pipe by hydraulic force, the cutting blade being slightly larger than the internal diameter of the pipe such that when the blade is fully lowered into the pipe, the flow of fluid into the pipe is stopped.

U.S. Pat. No. 4,552,170 teaches a valve insertable into an in-service pipe having two halves clamped around the pipe and a cutter connected to a valve handle which is rotated to drive the cutter through the pipe wall and position an expandable seal across the pipe bore, thereby terminating flow through the pipe Retraction of the seal and cutter opens the valve to reinitiate fluid flow and the valve can thereafter be used as a conventional shut off valve.

U.S. Pat. No. 3,948,282 teaches a method for attaching a water shut off control valve to an in service pipe by attaching a T pipe around the water pipe, mounting a valve assembly on the T pipe assembly, attaching a hole-boring assembly to the valve assembly and boring a hole into the water pipe, closing the valve and subsequently removing the hole-boring assembly, thereby maintaining the water within the pipe. A second valve assembly is then mounted to the free end of the previously mounted valve assembly and the valve seat thereof inserted through the opening into the water pipe to shut off the flow of water.

U.S. Pat. No. 3,749,108 teaches a valve stopper for insertion into an in-service pipe having a rubber patch clamp used in combination with a slide gate valve assembly. See also U.S. Pat. No. 4,655,480 and U.S. Pat. No. 4,431,017 which teach methods and apparatuses for connecting a branch line to an in-service pipe line.

One of the problems associated with installation of a full bore valve into an in-service plastic pipe is the requirement that the gate valve provide an effective seal when the gate is in the lowered position. Known apparatuses which feature a combination pipe cutter and gate valve as taught by the '955 patent, the '166 patent, and the '827 patent require a secondary motion once the gate has been inserted into the pipe to seal the gate against the open pipe ends. In the '955 patent, the two halves of the gate are forced against the seats machined into the upper and lower housing sections of the valve body by camming surfaces. In the '827 patent, the secondary motion to achieve a seal is effected by the tightening of thrust screws against the gate which push the gate against seats machined into the upper and lower housings of the valve body. The '166 patent teaches two cutters which are initially spread apart to cut away a segment of the top of a pipe which cutters are forced together by sealing surfaces as the cutters pass through the pipe. In addition, each of the devices taught by the '955 patent, the '166 patent, and the '827 patent require the removal of a "ring" of the pipe section due to the secondary movement requirements of the gate. This requirement doubles the force necessary for cutting through the pipe over a cutter which employs a single shear having one cutting edge. The secondary movement of the gate in these devices may require substantial forces. The practical implementation of these devices may make the use of plastic for the housing material unacceptable.

Finally, the device taught by the '115 patent utilizes a blade with a width which is slightly larger than the internal diameter of the pipe such that when the blade is lowered into the pipe, a slot is generated in the inner wall of the pipe into which the blade fits to provide a seal. However, such an approach provides a substantial amount of stress concentration due to alteration of the pipe geometry. Such stress concentration does not occur with a completely severed pipe which results in essentially two free ends of pipe. In addition, the effectiveness of the seal between the blade and the groove is questionable because the groove in the pipe tends to open as the blade moves through the pipe, an effect of the displacement of material at the cutting edge. In addition, even the smallest amount of material which lodges in the groove will prevent sealing of the blade within the groove.

SUMMARY OF THE INVENTION

It is an object of this invention to provide a full bore valve for plastic pipe which can be installed in plastic pipes through which a fluid is flowing without taking such pipes out of service.

It is another object of this invention to provide a full bore valve for plastic pipe which can be retrofitted into an existing pipeline with only one operation.

It is yet another object of this invention to provide a full bore valve for plastic pipe which can be inserted into an in-service plastic pipe without interrupting flow through th pipe.

It is yet another object of this invention to provide a full bore valve for plastic pipes which can be inserted into an in-service plastic pipe without squeezing the pipe.

It is yet another object of this invention to provide a full bore valve for plastic pipes which ca be inserted into an in-service plastic pipe without creating safety hazards due to static electricity.

It is yet another object of this invention to provide a full bore valve for plastic pipes which can be inserted into plastic pipes of any size.

It is yet another object of this invention to provide a full bore valve for plastic pipes which does not require separate seals for sealing the valve against the open pipe ends.

It is yet another object of this invention to provide a full bore valve for plastic pipes having a bypass for connection to a branch plastic pipe.

It is yet another object of this invention to provide a full bore valve for plastic pipe which requires no drilling machine, tapping valve, insertion machine, completion machine or completion plug for installation.

These and other objects of this invention are achieved by a combination pipe cutter and gate valve for plastic pipe in accordance with this invention comprising a valve body having a upper section and a lower section and means for securing the valve body circumferentially around a portion of the plastic pipe into which the gate valve is to be inserted. A shear having a shear face dimensionally configured to completely cover an open end of the plastic pipe is disposed within the valve body. Operatively connected to the shear and at least partially disposed within the upper section of the valve body is a means for actuating the shear. A cutting element is secured to the shear along a shear edge oriented toward the lower section of the valve body, that is, the leading edge of the shear. The cutting element forms a single cutting edge. To insure severance of the pipe, the cutting edge has a length greater than the outside diameter of the plastic pipe into which the valve is to be inserted.

In accordance with one embodiment of this invention, the upper and lower sections of the valve body are provided with longitudinally aligned guide grooves adapted to receive the lateral edges of the shear, thereby preventing the cutter/gate from turning as it is raised and lowered within the valve body. In addition, the lower section of the valve body is provided with a groove along its bottom adapted to receive the cutting edge of the shear.

In accordance with one embodiment of this invention, the cutting element is detachably secured to the shear. Thus, when cutting of the pipe has been completed, the cutting element may be detached from the shear, leaving the shear to function as the gate in the gate valve. In accordance with another embodiment of this invention the cutting element is integral with the shear.

To operate as a gate valve which can interrupt flow in the pipe when the gate/shear is in a lowered position, the open ends of the plastic pipe must be sealed against the gate/shear to prevent leakage of fluid from the pipe and around the gate/shear. It has been found through actual operation of this invention that as the shear passes through the plastic pipe, the pipe is deformed at its ends, forming seals against the faces of the shears. As a result, no secondary motion of the gate or other seals are required for effecting a seal between the pipe ends and the shear. This is in direct contrast to known prior art in which the shears, passing through the pipe, remove a ring from the pipe, thereby requiring a secondary motion of the gate to effect a seal against the pipe ends.

This invention provides a full bore valve for plastic pipe which can be retrofitted into existing plastic pipe systems with only on operation without the need for flow interruption through the pipe system or undesirably squeezing operations. In operation, the valve is attached to the pipe by either fusion, mechanical, or both fusion and mechanical methods. In accordance with one embodiment of this invention, the valve body is secured to the plastic pipe by a mechanical fastener assembly comprising mateable flanges formed by the upper and lower sections of the valve body and held together by threaded fasteners or clamping devices.

In accordance with another embodiment of this invention, electrofusion wires are embedded in the surfaces in the upper and lower sections of the valve body facing the pipe. Upon heating the wires, the plastic material surrounding the wires melts and fuses with the plastic material of the plastic pipe, securing the valve body around the plastic pipe.

In accordance with yet another embodiment of this invention, fusing of the valve body to the plastic pipe is accomplished by the application of a chemical solvent to the surfaces of the upper and lower sections of the valve body facing the plastic pipe such that the chemical solvent dissolves a portion of the plastic material of the valve body and the plastic pipe resulting in fusion of the upper and lower sections of the valve body to the plastic pipe.

In a particularly preferred embodiment of this invention, the upper section of the valve body comprises a bypass tap which is sealed off by the shear face facing the bypass tap when the shear is in a raised position. Disposed on the shear face opposite the shear face facing the bypass tap is a secondary cutting element adapted to remove a portion of pipe material as the shear passes through the pipe. As a result of the material being removed from the plastic pipe, a fluid in the plastic pipe can flow past the shear, past the bypass tap and into a bypass pipe connected thereto when the shear is in a lowered position. To accommodate the secondary cutting element, the upper section of the valve body is provided with a cavity.

BRIEF DESCRIPTION OF THE DRAWINGS

These and other features of this invention will be better understood from the detailed description and drawings wherein.

DESCRIPTION OF PREFERRED EMBODIMENTS

Figure 1:
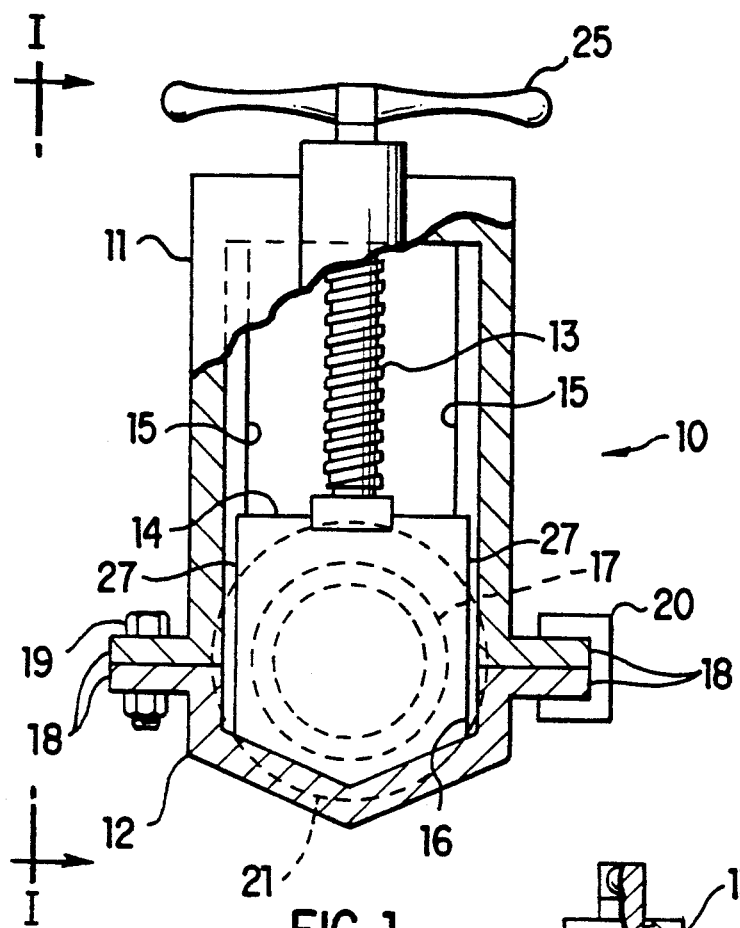
FIG. 1 shows a cutaway front view of a combined hot tap pipe cutter and gate valve in accordance with on embodiment of this invention.

A cutaway front view of a combination pipe cutter and gate valve in accordance with one embodiment of this invention is shown in FIG. 1. The combination pipe cutter and gate valve comprises valve body 10 having upper section 11 and lower section 12. Valve body 10 is secured around plastic pipe 17 by flanges 18 held together by threaded mechanical fasteners 19 and/or clamping mechanical fastener 20. Disposed within valve body 10 is shear 14 which is dimensionally configured to completely cover the open end of pipe 17.

Attached to shear 14 are means for actuating shear 14, in accordance with one embodiment of this invention, in the form of threaded valve stem 13. Thus, as valve handle 25 is turned, shear 14 can be raised and lowered.

Disposed along the leading edge of shear 14 is cutting element 26 which forms cutting edge 21. In order to completely sever pipe 17 as shear 14 passes through the walls of pipe 17, cutting edge 21, a single cutting edge, has a length greater than an outside diameter of plastic pipe 17. In this manner, not only is plastic pipe 17 severed, but also, the shear face of shear 11 which is dimensionally configured to completely cover an open end of the plastic pipe seals against the pipe end surface, thereby separating the two sections of the pipe.

Figure 2:
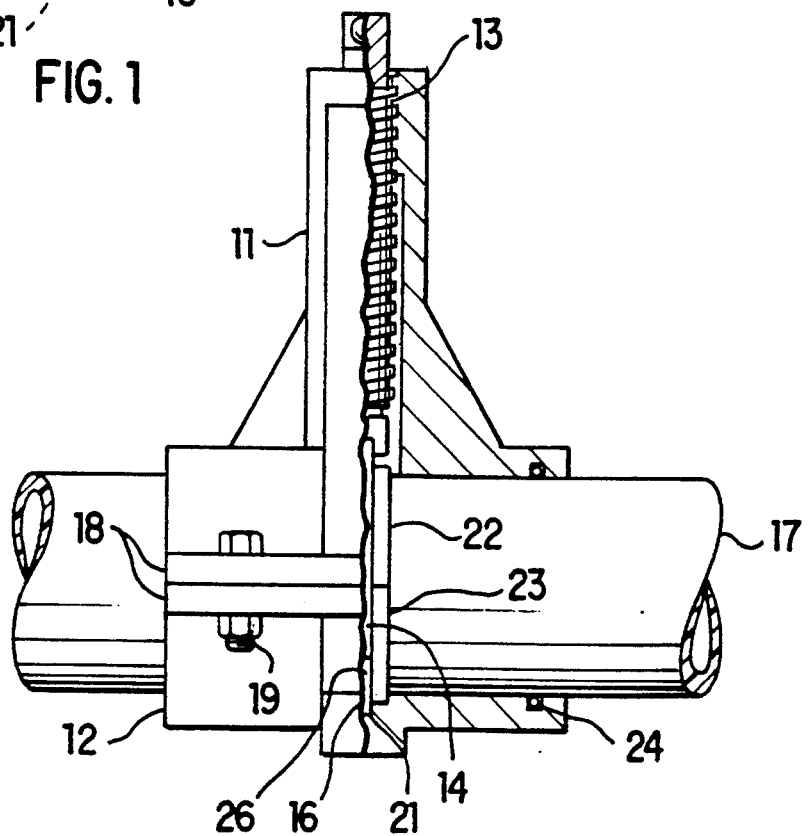
FIG. 2 is a side view of the invention shown in FIG. 1 along the line I—I.

In accordance with another embodiment of this invention, upper section 11 and lower section 12 are provided with upper integral seal 22 and lower integral seal 23 as shown in FIG. 2. In this case, the shear face of shear 14 seals against the integral seals 22, 23 of upper section 11 and lower section 12, respectively.

Once shear 14 has completely severed pipe 17 as shown in FIG. 1, shear 14 may be raised and lowered through actuating means in the form of valve handle 25, thereby stopping or enabling flow in the plastic pipe. In accordance with one embodiment of this invention, cutting element 26 is detachable from shear 14.

To provide proper guidance of shear 14 within valve body 10, in particular, to avoid rotation of shear 14 within valve body 10, upper section 11 and lower section 12 are provided with longitudinally aligned grooves 15 which guide lateral edges 27 of shear 14 as shear 14 is raised and lowered. In addition, lower section 12 is provided with lower section groove 16 adapted to receive cutting edge 21 of cutting element 26.

To effect cutting of the plastic pipe, cutting element 26 is provided with cutting edge 21 which is sharp. In accordance with another embodiment of this invention, cutting edge 21 is heated to a temperature sufficient to melt through the plastic material of plastic pipe 17. In accordance with yet another embodiment of this invention, shear 14 is vibrated ultrasonically to assist in cutting through pipe 17.

Figure 3:
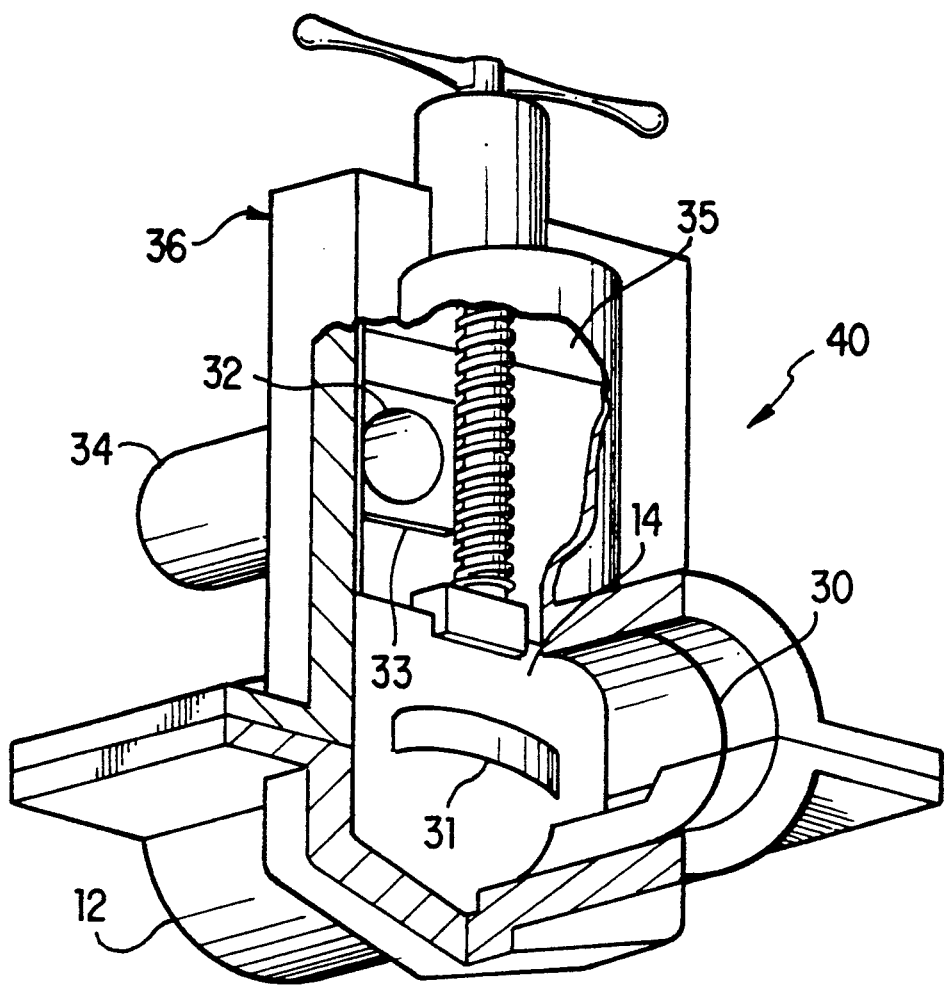
FIG. 3 is a perspective cutaway view of a combined hot ta pipe cutter and gate valve in accordance with another embodiment of this invention.

A combination pipe cutter and gate valve in accordance with another embodiment of this invention is shown in FIG. 3. Valve body 40 comprises lower section 12 and modified upper section 36. Connected to modified upper section 36 is bypass tap 34 which is in communication with bypass tap opening 32 formed by modified upper section 36. Disposed around bypass tap opening 32 is bypass tap seal 33 which forms a seal against the shear face of shear 14 facing bypass tap opening 32 when shear 14 is in a raised position.

Secondary cutting edge 31 is secured to the shear face of shear 14 facing away from bypass tap opening 32. To accommodate secondary cutting edge 31 when shear 14 is in a raised position, modified upper section 36 forms cavity 35. As shear 14 is lowered through plastic pipe 17, secondary cutting edge 31 cuts out a portion of the end of plastic pipe 17 thereby permitting fluid flowing through plastic pipe 17 to flow into cavity 35 and through bypass tap opening 32 when shear 14 is in a lowered position. When shear 14 is in a raised position, fluid in plastic pipe 17 flows normally through the valve.

A method for installing a gate valve on a plastic pipe containing fluid under pressure in accordance with this invention comprises the steps of attaching the valve stopper to the pipe and lowering the shear/gate completely to sever the pipe into two sections, thereby stopping flow of fluid within the pipe. In accordance with one embodiment of the process of this invention, the valve having an upper section and a lower section is secured to the plastic pipe using fusion, mechanical, or both fusion and mechanical methods. In accordance with one embodiment of the process of this invention, a valve box is set about the stopper valve such that the stopper valve can be operated from the surface above the pipe through the valve box with a valve key and backfilling about the pipe and valve box.

To construct a flow bypass between two valves, two valves having bypass taps as shown in FIG. 3 are attached to the pipe as before and the shear/gates of each valve lowered completely to sever the pipe, thereby stopping the flow of fluid within the pipe and allowing the pressurized fluid to flow past the shear/gate into the upper section of one valve through the bypass piping, into the upper section of the second valve, past the shear/gate thereof, and into the pipe. In this manner, flow in the pipe between the valves is interrupted.

While in the foregoing specification, this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

I claim:

1. A combination pipe cutter and gate valve for plastic pipe through which a fluid is flowing comprising:
   a valve body having an upper section and a lower section;
   means for securing said valve body circumferentially around a portion of said plastic pipe into which said gate valve is to be inserted;
   a shear disposed within said valve body, said shear on one side having a first shear face and on an opposite side having a second shear face, said first shear face dimensionally configured to completely cover an open end of said plastic pipe;
   means for actuating said shear operatively connected to said shear;
   a cutting element secured to said shear disposed along a shear edge oriented toward said lower section of said valve body, said cutting element forming one cutting edge having a length greater than an outside diameter of said plastic pipe;
   said upper section of said valve body comprising a bypass tap;
   a secondary cutting element secured to said second shear face, said secondary cutting element adapted to remove an amount of pipe material as said shear is moved to a lowered position during cutting of said plastic pipe, forming a communication channel for fluid flow between said plastic pipe and said bypass tap; and
   said shear interrupting said fluid flow between said plastic pipe and said bypass tap when said shear is in a raised position.

2. A combination pipe cutter and gate valve in accordance with claim 1, wherein said lower section of said valve body forms a groove adapted to receive said cutting edge.

3. A combination pipe cutter and gate valve in accordance with claim 1, wherein said upper section and said lower section form longitudinally aligned guide grooves adapted to receive the lateral edges of said shear.

4. A combination pipe cutter and gate valve in accordance with claim 1, wherein said cutting element is detachable from said shear.

5. A combination pipe cutter and gate valve in accordance with claim 1, wherein said cutting element is integral with said shear.

6. A combination pipe cutter and gate valve in accordance with claim 1, wherein said means for securing said valve body around said plastic pipe comprises a mechanical fastener assembly.

7. A combination pipe cutter and gate valve in accordance with claim 6, wherein said mechanical fastener assembly comprises at least one upper flange integral with said upper section and at least one lower flange integral with said lower section, said upper flange and said lower flange mateable with each other and extending longitudinally along said plastic pipe, said upper flange and said lower flange secured to each other by means for securing flanges.

8. A combination pipe cutter and gate valve in accordance with claim 1, wherein said valve body is constructed of a plastic material.

9. A combination pipe cutter and gate valve in accordance with claim 8, wherein said means for securing said valve body around said plastic pipe comprises means for fusing said valve body to said plastic pipe.

10. A combination pipe cutter and gate valve in accordance with claim 9, wherein said means for fusing said valve body to said plastic pipe comprises at least one heating wire embedded in the surface of each of said upper section and said lower section of said valve body facing said plastic pipe whereby said plastic material surrounding said wires is melted, fusing each of said upper section and said lower section of said valve body to said plastic pipe.

11. A combination pipe cutter and gate valve in accordance with claim 9, wherein said means for fusing said valve body to said plastic pipe comprises a chemical solvent applied to at least the surfaces of said upper section and said lower section of said valve body facing said plastic pipe whereby said chemical solvent dissolves a portion of said plastic material and said plastic pipe, fusing said upper section and said lower section of said valve body to said plastic pipe.

12. A combination pipe cutter and gate valve in accordance with claim 1, wherein said cutting edge is a sharp edge.

13. A combination pipe cutter and gate valve in accordance with claim 1, wherein said cutting edge is heated to a temperature sufficient to melt said plastic pipe.

14. A combination pipe cutter and gate valve in accordance with claim 1, wherein said cutting edge is ultrasonically vibrated.

15. A combination pipe cutter and gate valve in accordance with claim 1, wherein an upper seal is integrally disposed within said upper section and a lower seal is integrally disposed within said lower section, said upper seal and said lower seal sealing against said shear face of said shear when said shear is in a lowered position.

16. A combination hot tap gate valve and branch connection for a plastic pipe through which a fluid is flowing comprising:
   a valve body having an upper section and a lower section, said upper section having a bypass tap opening;
   means for securing said valve body circumferentially around a portion of said plastic pipe;
   a shear disposed within said valve body, said shear having a first shear face on one side of said shear dimensionally configured to completely cover an open end of said plastic pipe when said shear is moved to a lowered position during cutting of said plastic pipe and to completely cover said bypass tap opening when said shear is moved to a raised position;

means for raising and lowering said shear operatively connected to said shear;

a cutting element secured to said shear disposed along a shear edge oriented toward said lower section of said valve body, said cutting element forming a single cutting edge having a length greater than an outside diameter of said plastic pipe; and a secondary cutting element secured to a second shear face on a side of said shear opposite said first shear face and facing away from said bypass tap, said secondary cutting element forming a communication channel for fluid flow between said pipe and said bypass tap as said shear is moved to said lowered position during cutting of said plastic pipe.

17. A combination hot tap gate valve and branch connection in accordance with claim 16, wherein said shear is fully retractable into said upper section of said valve body.

18. A combination hot tap gate valve and branch connection in accordance with claim 16, wherein said cutting element is detachable from said shear.

* * * * *